United States Patent
Schoen

(10) Patent No.: US 11,663,734 B2
(45) Date of Patent: *May 30, 2023

(54) SYSTEMS AND METHODS OF MEASURING AN OBJECT IN A SCENE OF A CAPTURED IMAGE

(71) Applicant: Matthew B. Schoen, Ojai, CA (US)

(72) Inventor: Matthew B. Schoen, Ojai, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,221

(22) Filed: Jun. 28, 2021

(65) Prior Publication Data

US 2021/0327083 A1     Oct. 21, 2021

Related U.S. Application Data

(62) Division of application No. 16/053,478, filed on Aug. 2, 2018, now Pat. No. 11,080,877.

(51) Int. Cl.
*H04N 7/18*      (2006.01)
*G06T 7/60*      (2017.01)
(Continued)

(52) U.S. Cl.
CPC ............... *G06T 7/60* (2013.01); *G01S 15/42* (2013.01); *G01S 17/42* (2013.01); *H04N 7/183* (2013.01)

(58) Field of Classification Search
CPC .. H04N 7/18; H04N 7/183; G06T 7/60; G01S 15/42; G01S 17/42
(Continued)

(56) References Cited

U.S. PATENT DOCUMENTS 7,679,507 B2   3/2010   Babich
7,710,455 B2   5/2010   Aramaki
(Continued)

FOREIGN PATENT DOCUMENTS

CA        2872844 A1    6/2016

OTHER PUBLICATIONS

Pu et al., "Novel Object-Size Measurement Using the Digital Camera", 2016 IEEE Advanced Information Management, Communicates, Electronic and Automation Control Conference (IMCEC), IEEE, Oct. 3, 2016 (Oct. 3, 2016), pp. 543-548, XP033070750, DOI: 10. 1109/IMCEC.2016.7867270 [retrieved on Feb. 28, 2017].
(Continued)

*Primary Examiner* — Trang U Tran
(74) *Attorney, Agent, or Firm* — Kevin Roddy; Butzel Long

(57) ABSTRACT

Systems and methods are provided that include a plurality of sensors, communicatively coupled to one another, to periodically transmit positional location information. A digital image capture device, communicatively coupled to the plurality of sensors, may capture an image of a scene which includes at least one of the plurality of sensors. A processor, communicatively coupled to the digital capture device, may determine a measurement of a least one object in the captured image of the scene, where the measurement of the at least one object is based at least in part on the positional location information received by the digital image capture device at the time that the image of the scene is captured. A display device, communicatively coupled to the processor, may display the determined measurements of the at least one object.

3 Claims, 10 Drawing Sheets

(51) Int. Cl.
*G01S 15/42* (2006.01)
*G01S 17/42* (2006.01)

(58) Field of Classification Search
USPC ................................................ 348/135, 143
See application file for complete search history.

(56) References Cited

U.S. PATENT DOCUMENTS

| | | | |
|---|---|---|---|
| 8,437,508 B2 | 5/2013 | Akisada | |
| 8,531,521 B2 | 9/2013 | Romanowich | |
| 8,531,523 B2* | 9/2013 | Anderson | G06V 20/52 |
| | | | 348/169 |
| 8,773,508 B2 | 7/2014 | Daniel | |
| 9,202,526 B2 | 12/2015 | Hohteri | |
| 9,223,008 B1 | 12/2015 | Hartman | |
| 9,400,930 B2 | 7/2016 | Moeglein | |
| 9,449,491 B2 | 9/2016 | Sager | |
| 9,684,056 B2 | 6/2017 | Khanfor | |
| 9,736,368 B2* | 8/2017 | Lablans | H04N 5/247 |
| 10,032,480 B2 | 7/2018 | Fisher | |
| 2014/0210950 A1 | 7/2014 | Atanassov | |
| 2015/0077517 A1 | 3/2015 | Powers | |
| 2016/0173827 A1 | 6/2016 | Dannan | |
| 2016/0253808 A1 | 9/2016 | Metzler | |
| 2016/0292511 A1 | 10/2016 | Ayalasomayajula | |
| 2017/0195654 A1 | 7/2017 | Powers | |

OTHER PUBLICATIONS

Kainz et al., "Estimating the Object Size from Static 2D Image", 2015 International Conference and Workshop on Computing and Communication (IEMCON), IEEE, Oct. 15, 2015, XP032823394, [retrieved on Dec. 2, 2015] 6 pages.

International Search Report and Written Opinion for App No. PCT/US2019/043634, dated Oct. 16, 2019, 12 pages.

David d'Angelo et al., "CamInSens—An Intelligent in-situ Security System for Public Spaces," In Proceedings of the International Conference on Security and Management (SAM), 2012. 8 pages. URL: https://search.proquest.com/docview/1426803092?accountid=142944.

* cited by examiner

SYSTEMS AND METHODS OF MEASURING AN OBJECT IN A SCENE OF A CAPTURED IMAGE

BACKGROUND

Present imaging systems are used to capture images, and to track the movement of objects or persons within the captured images. For example, such systems may incorporated into home security systems to track the movement of a person or an object, or used in systems that track the position of a player or a ball during a sporting event. Similar systems may be used in manufacturing products. That is, current imaging systems may track movement, and provide statistics regarding the movement for sports, security, and manufacturing applications.

BRIEF SUMMARY

According to an implementation of the disclosed subject matter, a system is provided that includes a plurality of sensors, communicatively coupled to one another, to periodically transmit positional location information. The system may include a digital image capture device, communicatively coupled to the plurality of sensors, to capture an image of a scene which includes at least one of the plurality of sensors. The system may include a processor, communicatively coupled to the digital capture device, to determine a measurement of a least one object in the captured image of the scene, where the measurement of the at least one object is based at least in part on the positional location information received by the digital image capture device at the time that the image of the scene is captured. The system may include a display device, communicatively coupled to the processor, to display the determined measurements of the at least one object.

According to an implementation of the disclosed subject matter, a method is provided that includes receiving, at a digital image capture device, periodic transmissions of positional location information from a plurality of sensors. The method may include capturing, at the digital image capture device, an image of a scene which includes at least one of the plurality of sensors. The method may include determining, at a processor communicatively coupled to the digital image capture device, a measurement of a least one object in the captured image of the scene, where the measurement of the at least one object is based at least in part on the positional location information received by the digital image capture device at the time that the image of the scene is captured. The method may include displaying, at a display device communicatively coupled to the processor, the determined measurements of the at least one object.

According to an implementation of the disclosed subject matter, a system is provided that may include a first sensor to transmit first positional location information, and a second sensor to transmit second positional location information. The first sensor and the second sensor may be communicatively coupled to one another and a digital image capture device, and the digital image capture device uses the first and second positional location information to provide measurement information for an object captured in a scene that includes at least one of the first sensor and the second sensor.

According to an implementation of the disclosed subject matter, means for determining a measurement of an object in an image are provided, including means for receiving, at a digital image capture device, periodic transmissions positional location information from a plurality of sensors. The implementation may include means for capturing, at the digital image capture device, an image of a scene which includes at least one of the plurality of sensors. The implementation may include means for determining, at a processor communicatively coupled to the digital image capture device, a measurement of a least one object in the captured image of the scene, where the measurement of the at least one object is based at least in part on the positional location information received by the digital image capture device at the time that the image of the scene is captured. The implementation may include means for displaying, at a display device communicatively coupled to the processor, the determined measurements of the at least one object.

Additional features, advantages, and embodiments of the disclosed subject matter may be set forth or be apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
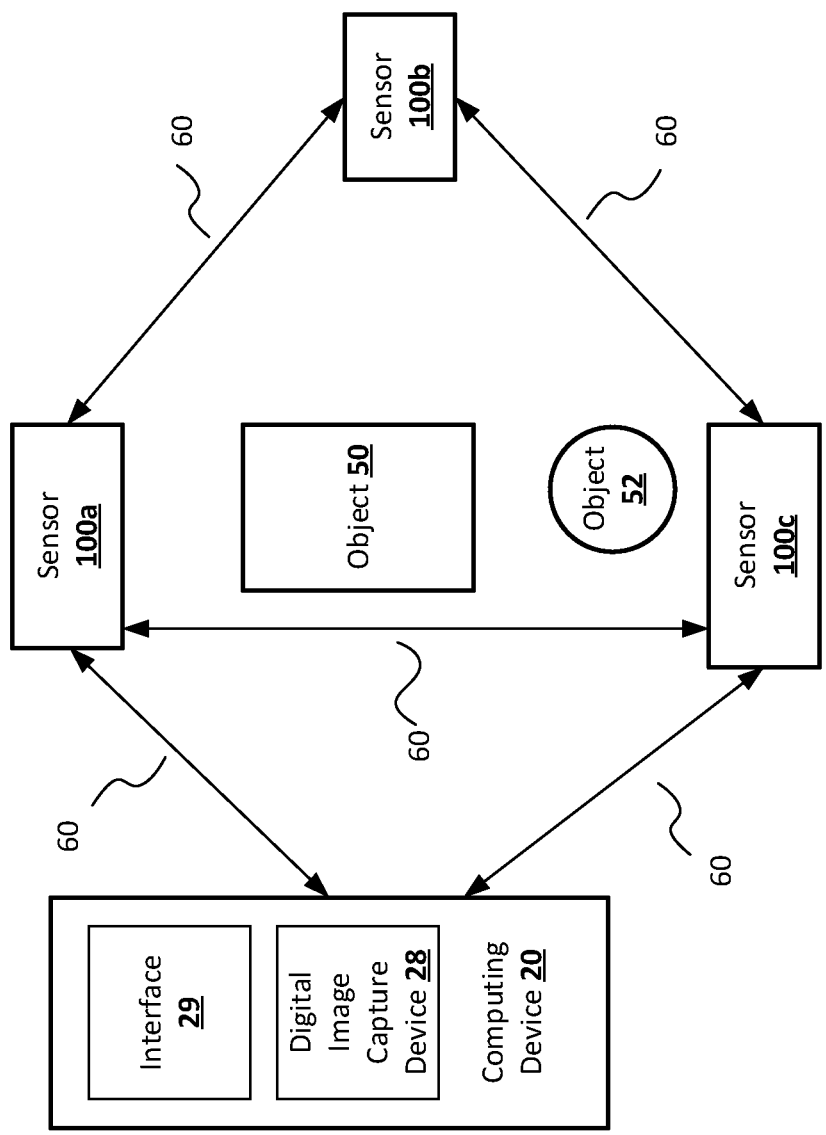
FIG. 1 shows a computing device having a digital image capture device which may capture a scene that may include at least one object, and may provide dimensions of the object based on positional information received from sensors within the scene according to an implementation of the disclosed subject matter.

Implementations of the disclosed subject matter provide systems and methods of capturing a scene that includes digital sensors, and determining a measurement of an object in the scene based on the positional information received by an image capture device from the sensors at the same time that the image of the scene is captured.

In a room or area, a user may place, distribute, disperse, and/or space one or more sensors from an object of interest. In some implementations, the sensors may be configured to be thrown or otherwise physically dispersed throughout an area without damaging the electronic components of the sensor, such that they may be easily dispersed (e.g., by a user) near the object of interest. The sensors may be dispersed either in a uniform manner (e.g., the distances between the object and each sensor may be the same), or may be dispersed with a non-uniform distance from the object of interest (e.g., each sensor may be located at a different distance from the object of interest, or some sensors may be located the same distance from the object of interest while other sensors are located at different distances).

A digital image capture device, which may be included in a computing device, may capture an image of a scene that includes the object of interest. The user may select the object from the scene displayed on a display of the computing device. The displayed scene may include one or more of the dispersed sensors. Regardless of whether the sensors are depicted in the captured image, the sensors may transmit positional location information to the computing device. The computing device may determine dimensions of the selected object, and display the dimensions of the selected object on the display for the user.

Implementations of the disclosed subject matter may determine and display the dimensions of an object in a captured image for a user, without the use of traditional measuring tools, such as a tape measure. As such, implementations of the disclosed subject matter may increase the ease and convenience of determining measurements of objects, such as those captured in a photographic image. The image and the measurements of the object may be stored and referred to by the user of the computing device when needed. That is, the image may include a visual representation of the object of interest, as well as its dimensions, in the context of a room or area. Measurements of other objects in the captured scene may be obtained by selecting the object of interest in the scene, as the positional location information of the sensors shown in the image (or those outside of the image) may be stored and used to determine the measurements of the selected object. The dimensions of the sensors in the captured scene may be stored and/or transmitted to the user's computing device, and used to determine the measurements of the selected object. Accuracy of the measurements of the object may be increased by increasing the number of sensors used when capturing the image.

FIG. 1 shows a computing device 20 having a digital image capture device 28 which may capture at least a portion of a scene (e.g., scene 200 shown in FIG. 4) that may include at least one object (e.g., object 50, object 52, or the like), and may provide dimensions of the object based on positional information received from sensors (e.g., sensor 100a, 100b, and/or 100c) within the scene according to an implementation of the disclosed subject matter. The computing device 20 is shown and described in detail in connection with FIG. 8. In some implementations, the sensors (e.g., sensor 100a, 100b, and/or 100c) may transmit distance information that include distances between a sensor device and one or more nodes physically coupled to the sensor device, as described below in connection with FIG. 2B.

The digital image capture device 28 may include an image sensor, such as a digital image sensor, a charged coupled device (CCD), or the like to convert received light into one or more electrical signals to represent a captured image. The digital image capture device 28 may include one or more lenses to image a scene onto the image sensor. The one or more lenses may have a fixed focal length, or may be a wide angle lens (e.g., having a focal length of 10-42 mm), a telephoto lens (e.g., having a focal length of 100 m-800 mm), a zoom lens (e.g., having a variable focal length of 24-300 mm), a fisheye lens (e.g., having a focal length of 7-16 mm), a macro lens for close-up imaging (e.g., having a focal length of 50-200 mm), and/or a tilt-shift lens, or more generally, any known lens arrangement may be used. The digital image capture device 28 may capture an image of at least a portion of a scene (e.g., scene 200 shown in FIG. 5) that may include an object, such as object 50 and/or object 52.

The digital image capture device 28 may include image processing circuitry and/or executable computer instructions to adjust a white balance, adjust the color balance (i.e., color correction), reduce noise in an image, adjust sharpness of a captured image, reduce motion blur and/or jitter (e.g., when the object to be captured is moving and/or the digital image capture device 28 is moving), and/or provide image stabilization. In some implementations, the image processing circuitry may be integrated with the digital image capture device 28.

The computing device 20 may include communications interface 29 (described in detail below in connection with FIG. 8), to receive positional information received from one or more of sensors 100a, 100b, and/or 100c. The sensors 100a, 100b, 100c may be disposed around and/or adjacent to an object to be measured, such as object 50 and/or object 52. The sensors 100a, 100b, 100c may be spaced from the computing device 20. In some implementations, the communications interface 29 may transmit one or more messages to determine if any sensors 100a, 100b, and/or 100c are located within a predetermined range from the computing device 20. The computing device 20 may control the communications interface 29 to transmit requests to one or more of the sensors 100a, 100b, and/or 100c for positional location information. In some implementations, the requests for positional location information may be periodic (e.g., at predetermined time intervals).

FIG. 1 shows that sensors 100a, 100b, and/or 100c may be disposed around and/or adjacent to an object, such as object 50 and/or object 52, which may be selected as the object of interest to be measured. Although three sensors are shown in FIG. 1 to measure the object 50 and/or object 52, there may be more than three sensors or fewer than three sensors. As the number of sensors used to measure an object increases, the precision and/or accuracy of the measurement of the object (e.g., object 50) may increase. The sensors 100a, 100b, and/or 100c may be dispersed by a user, either placed near and/or adjacent to an object of interest, or may be randomly dispersed at different distances from the object 50.

Figure 2A:
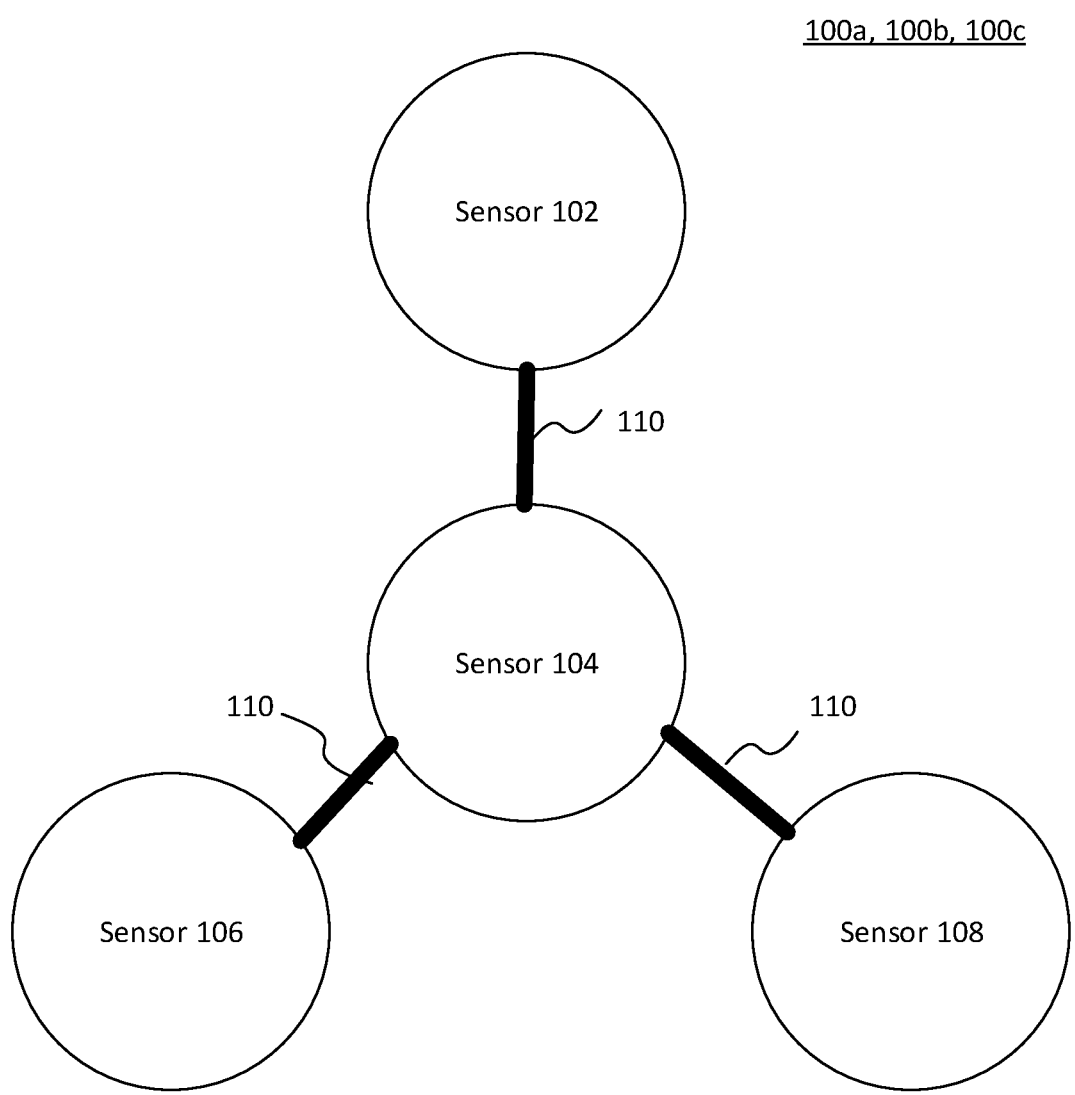
FIG. 2A shows an example sensor device having a plurality of sensors according to an implementation of the disclosed subject matter.

FIG. 2A shows an example of a sensor device (e.g., sensor 100*a*, 100*b*, 100*c*) having a plurality of sensors according to an implementation of the disclosed subject matter. The sensor device shown in FIG. 2A may be a top-down or a side profile of the sensor device, where one sensor of the device is not shown. That is, in some implementations, the sensor may have a central sensor, with one sensor disposed above and three sensors disposed below the central sensor to form a base (e.g., in a triangular pattern). The sensors 100*a*, 100*b*, 100*c* may be capable of being thrown. In such implementations, the sensors 100*a*, 100*b*, 100*c* may be configured with protective casing, cladding, or the like to minimize damage (e.g., from impact with one or more surfaces or objects) and maintain operability of the sensors.

As shown in FIG. 2A, a sensor 100*a*, 100*b*, and/or 100*c* may include one or more sensors 102, 104, 106, and/or 108. Although four sensors 102, 104, 106, and/or 108 are shown, a sensor 100*a*, 100*b*, and/or 100*c* may have greater or fewer sensors. The sensors 102, 104, 106, and/or 108 may be communicatively and/or physically connected to one another via connective members 110. The sensors 102, 104, 106, and/or 108 may be the same type of sensor, may have two or more sensors that are the same type, and/or may have one or more sensors that may be different types. The types of sensors for sensors 102, 104, 106, and/or 108 may include one or more of a global positioning system (GPS) sensor, an accelerometer, a gyroscope, a compass, and/or an inertial movement unit (IMU), a motion sensor, a linear position sensor, an angular position sensor, a multi-axis position sensor, or the like. In some implementations, the sensors 102, 104, 106, and/or 108 may transmit and/or receive sound signals (e.g., ultrasonic signals) using a transducer (e.g., using one or more ultrasonic transducers, a transducer array, or the like). In some implementations, the sensors 102, 104, 106, and/or 108 may transmit and/or receive light signals (e.g., infrared (IR) light signals). The light signals may be output by one or more light emitting diodes (LEDs), organic light emitting devices (OLEDs), and/or lasers (e.g., one or more semiconductor lasers). Reflected light signals may be received by a light sensor (e.g., a sensor that receives IR wavelengths or other suitable wavelengths of the reflected light signals).

The position sensor may be any device that is configured to perform position measurement, and may be an absolute position sensor or a relative position sensor. The sensor 100*a*, 100*b*, and/or 100*c* may include a communications interface to transmit positional location information (e.g., the location of the sensor in space or a particular area) from the sensor 100*a*, 100*b*, and/or 100*c* to the digital image capture device 28 via communications link 60. In some implementations, the computing device 20 may receive the positional location information from the sensor 100*a*, 100*b*, and/or 100*c* via the communications interface 29. One or more of the sensors 100*a*, 100*b*, and/or 100*c* may transmit their respective positional location information to one another via communications link 60. In implementations of the disclosed subject matter, the communications link may be a wireless and/or wired communications link.

In some implementations, the sensors 100*a*, 100*b*, 100*c* may determine their position relative to one another and/or relative to the computing device 20 by transmitting a signal and determining the amount of time for the signal to be received by another sensor or the computing device. The signals may be transmitted and received via communications interfaces of the respective sensors. For example, the sensor 100*a* may transmit a signal to sensor 100*b*, which may acknowledge receipt of the signal. As the sensor 100*a* may store a time in which the signal was transmitted, the sensor 100*a* may be able to determine the distance to the sensor 100*b* based on the acknowledgement signal received from the sensor 100*b*. That is, the acknowledgement signal of sensor 100*b* may include a time that the transmitted message from the sensor 100*a* was received by the sensor 100*b*. As the propagation time of a signal (e.g., "time-of-flight") may linearly increase with respect to distance, the sensor 100*a* may determine the distance to sensor 100*b* based on the time that the signal was transmitted by the sensor 100*a* and received by sensor 100*b*. The distances between each of the sensors 100*a*, 100*b*, 100*c*, and/or the computing device 20 may be determined in a similar manner.

Figure 2B:
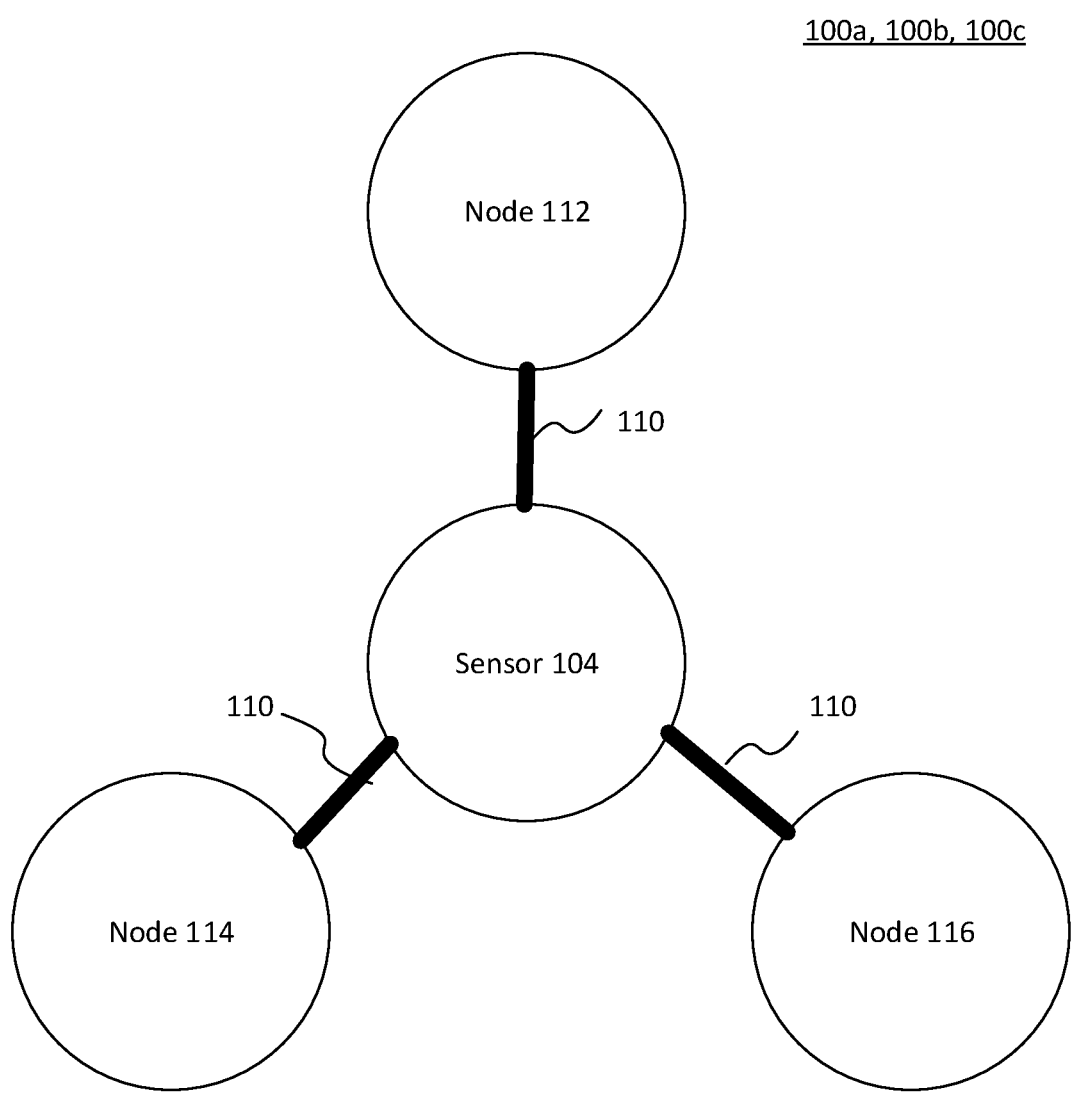
FIG. 2B shows an example sensor device having a sensor and a plurality of nodes according to an implementation of the disclosed subject matter.

FIG. 2B shows an example of the sensor 100*a*, 100*b*, 100*c* having a sensor and a plurality of nodes according to an implementation of the disclosed subject matter. The sensor 104 and the nodes 112, 114, and 116 may be physically connected to one another via connective members 110. The sensor device shown in FIG. 2B may be a top-down or a side profile of the sensor device, where one node of the device is not shown. That is, in some implementations, the sensor may have a central sensor, with one node disposed above and three nodes disposed below the central sensor to form a base (e.g., in a triangular pattern). Although sensor 104 is shown as being central to the other nodes 112, 114, and 116 that are coupled to it, the sensor 104 may alternatively be located in the positions of node 112, 114, or 116 (e.g., where a node is centrally located in the position occupied by sensor 104 shown in FIG. 2B). The nodes 112, 114, and/or 116 may be spherical structures which may, depending upon the orientation of the sensor 110*a*, 100*b*, 100*c*, support the sensor 104. The nodes 112, 114, 116 the sensors 100*a*, 100*b*, 100*c* may be formed of a material to minimize damage from impact with one or more surfaces or objects. Alternatively, the nodes 112, 114, 116 may be configured with protective casing, cladding, or the like to minimize damage when the sensor 100*a*, 100*b*, 100*c* is thrown.

The sensor 104 shown in FIG. 2B may include one or more of a global positioning system (GPS) sensor, an accelerometer, a gyroscope, a compass, and/or an inertial movement unit (IMU), a motion sensor, a linear position sensor, an angular position sensor, a multi-axis position sensor, or the like. In some implementations, the sensor 104 may transmit and/or receive sound signals (e.g., ultrasonic signals) using a transducer (e.g., using one or more ultrasonic transducers, a transducer array, or the like). In some implementations, the sensor 104 may transmit and/or receive light signals (e.g., IR light signals). Reflected light signals may be received by a light sensor (e.g., a sensor that receives IR wavelengths or other suitable wavelengths of the reflected light signals). The position sensor may be any device that is configured to perform position measurement, and may be an absolute position sensor or a relative position sensor.

The sensor 100*a*, 100*b*, and/or 100*c* may include a communications interface (e.g., communications interface 104*b* shown in FIG. 3 and described below) to transmit positional location information (e.g., the location of the sensor in space or a particular area) from the sensor 100*a*, 100*b*, and/or 100*c* to the digital image capture device 28 via communications link 60. The communications interface may also transmit distance information that includes one or more of a distance between sensor 104 and node 112, a distance between the sensor 104 and the node 114, and/or a distance between the sensor 104 and the node 116. The distances between the sensor 104 and the node 112, 114, 116 may be from center-to-center (e.g., from the center of the sensor 104 to the center of the node 112, 114, 116), center-to-edge (e.g., from the center of the sensor 104 to an outer edge of the node 112, 114, 116), and/or from edge-to-edge (e.g., from an outer edge of the sensor 104 to an outer edge of the node 112, 114, 116). The distances between the sensor 104 and the nodes 112, 114, 116, and/or the dimensions of the nodes 112, 114, 116, may be stored at the sensor 104 and may be transmitted via the communications interface 104b to the computing device 20.

In some implementations, the communications interface (e.g., communications interface 104b shown in FIG. 3 and described below) of the sensor 100a, 100b, and/or 100c may transmit information to the computing device 20 based on the reflected ultrasonic signals received by the sensor 100a, 100b, and/or 100c. In some implementations, the communications interface may transmit information to the computing device 20 based on the received reflected light signals.

The computing device 20 may receive the positional location information and/or distance measurements from the sensor 100a, 100b, and/or 100c via the communications interface 29. One or more of the sensors 100a, 100b, and/or 100c may transmit their respective positional location information and/or distance measurements to one another via communications link 60.

Although FIGS. 2A-2B show example arrangements of the sensor 100a, 100b, and/or 100c, the sensor 100a, 100b, 100c is not limited thereto, and may have any suitable shape or arrangement. In some implementations, the sensors 100a, 100b, 100c may be configured to be thrown or otherwise physically dispersed throughout an area without damaging the electronic components of the sensor.

Figure 3:
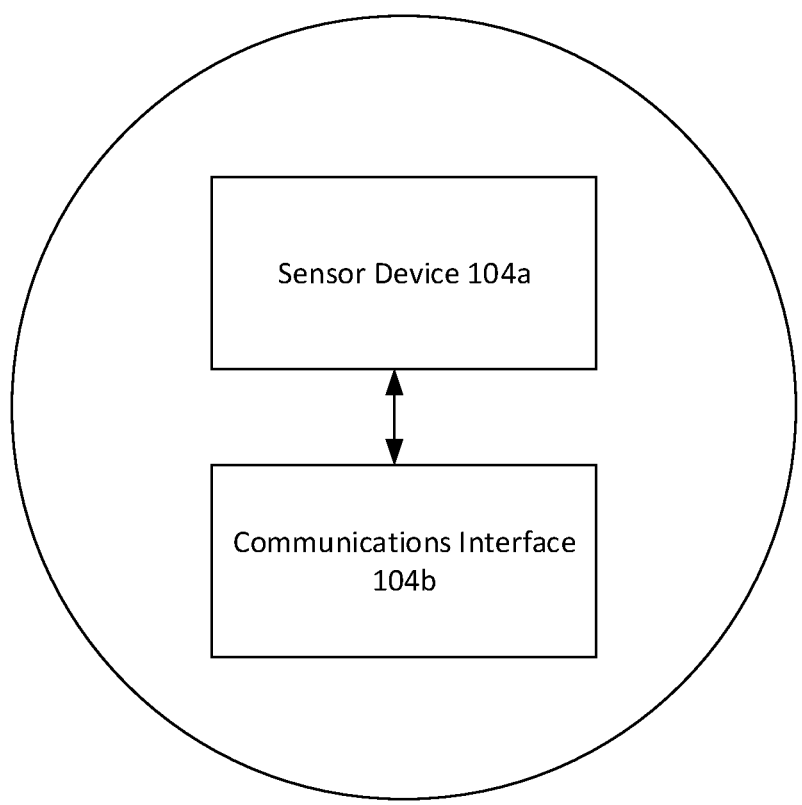
FIG. 3 shows an example sensor in the sensor device shown in FIGS. 2A and 2B according to an implementation of the disclosed subject matter.

FIG. 3 shows an example of a sensor 104 of the sensor 100a, 100b, and/or 100c shown in FIGS. 2A-2B according to an implementation of the disclosed subject matter. Although sensor 104 is shown, the features shown in FIG. 3 may be the same for sensors 102, 106, and/or 108 shown in FIG. 2A. The sensor 104 may include a sensor device 104a, communications interface 104b, and the like. The sensor device 104a may be any suitable hardware and/or software to determine location of the sensor 104 in a spatial environment. For example, the sensor device 104a may be one or more of a global positioning system (GPS) sensor, an accelerometer, a gyroscope, a compass, and/or an inertial movement unit (IMU), a motion sensor, a linear position sensor, an angular position sensor, a multi-axis position sensor, or the like. In some implementations, the sensor 104a may transmit and/or receive sound signals (e.g., ultrasonic signals) using a transducer (e.g., using one or more ultrasonic transducers, a transducer array, or the like). In some implementations, the sensor 104a may transmit and/or receive light signals (e.g., IR light signals). The reflected light signals may be received by a light sensor portion of sensor 104a (e.g., a portion that receives IR wavelengths or other suitable wavelengths of the reflected light signals).

In some implementations, the sensor device 104a may determine its position relative to the computing device, and/or its position relative to sensors 102, 106, and/or 108. The communications interface 104b may be communicatively coupled to the sensor device 104a. In some implementations, the communications interface 104b may communicate with the sensors 102, 106, and/or 108 shown in FIG. 2A, and/or the communications interface 29 of computing device 20 via a suitable network connection.

Figure 4:
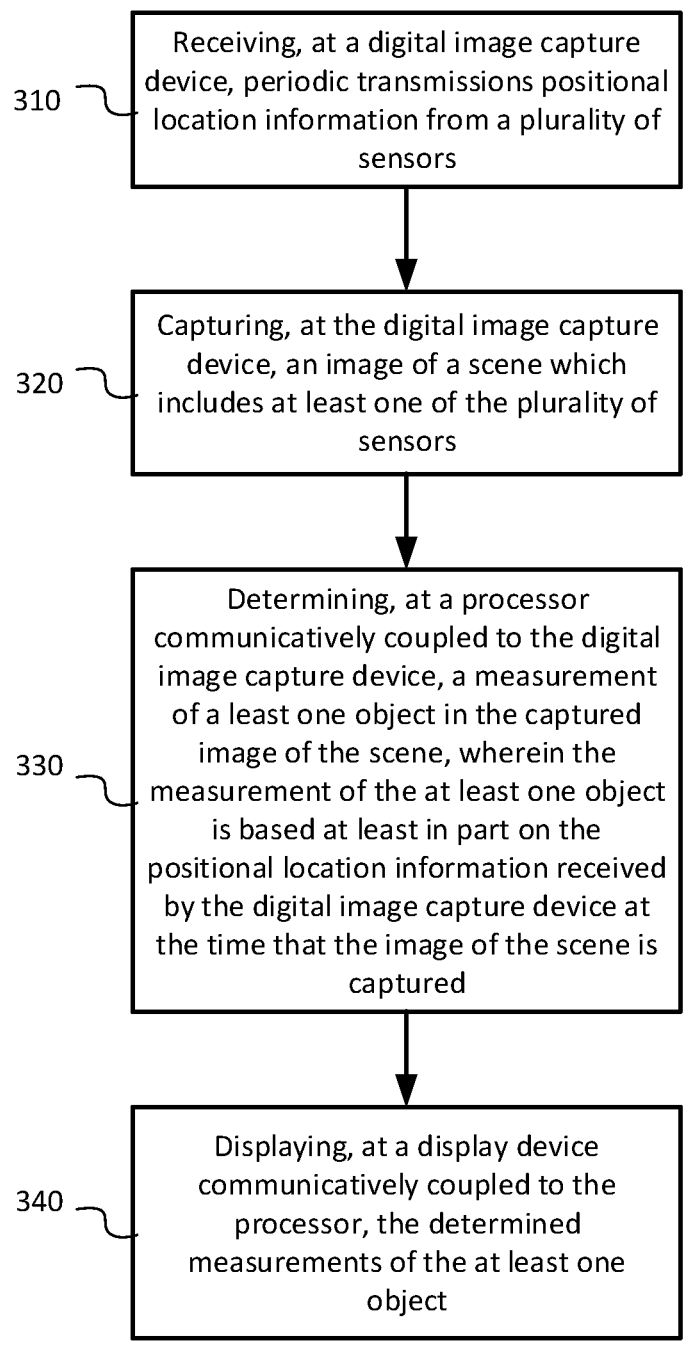
FIG. 4 shows an example method of capturing an image and determining a measurement of at least one object in the captured scene based on positional location information from one or more sensors according to an implementation of the disclosed subject matter

FIG. 4 shows an example method 300 of capturing an image and determining a measurement of at least one object (e.g., object 50 and/or object 52) in the captured scene based on positional location information and/or distance measurements (e.g., a distance between the sensor 104 and the nodes 112, 114, and/or 116 as described above in connection with FIG. 2B) from one or more sensors according to an implementation of the disclosed subject matter. At operation 310, the digital image capture device 28 of computing device 20 may receive periodic transmissions positional location information from a plurality of sensors, such as from sensors 100a, 100b, and/or 100c. In some implementations, the image capture device 28 of the computing device 20 may receive periodic transmission of positional location information (e.g., the positional location of sensor 104 shown in FIG. 2B) and of distance measurements (e.g., distances between the sensor 104 and the nodes 112, 114, and/or 116).

The positional location information and/or distance measurements may be for the sensors within a predetermined area, such as those distributed within a scene or area that is located within a predetermined distance from the computing device 20. For example, the computing device 20 may receive the positional location information and/or distance information from sensors that are spaced from the computing device 20. That is, the communications interface 29 of the computing device 20 may receive the positional location information and/or distance information from, for example, the communications interface of sensor 100a, 100b, and/or 100c. The positional location information may be a coordinate location of the sensor 100a, 100b, and/or 100c in the scene or area, such as: numbers representing vertical and horizontal position; numbers representing elevation; latitude, longitude, and elevation; GPS coordinates; Cartesian coordinates (x, y, z); earth-centered earth-fixed (ECEF) coordinates; geodetic coordinates; and/or any other numbers that represent spatial position in a scene or area. As described above in connection with FIG. 2B, the distance information may be a distance from the center of the sensor 104 to the center of the node 112, 114, and/or 116, a distance from the center of the sensor 104 to an outer edge of the node 112, 114, and/or 116, and/or from an outer edge of the sensor 104 to an outer edge of the node 112, 114, and/or 116. In some implementations, the communications interface 29 of the computing device 20 may receive relative positional information of the sensors from one another (e.g., one or more of the sensors may transmit the relative position information to the computing device 20) that is determined by time-of-flight measurements of a signal as described above.

The sensors 100a, 100b, 100c, or the like may be within a scene or area that may be captured by the digital image capture device 28. One or more of the sensors 100a, 100b, 100c, or the like may be located outside of the scene or area capable of being captured by the digital image capture device 28, but may transmit positional location information and/or distance information that may be received by the communications interface 29.

As the number of sensors (e.g., sensors 100a, 100b, 100c, or the like) that are dispersed throughout a scene or area increases, the computing device 20 may correspondingly receive an increased amount of positional location information and/or distance information. As the number of sensors increases and/or the amount of distance information received by the computing device 20 increases, the accuracy of measurement of the object 50, 52 by the computing device 20 within a scene or area may increase.

Figure 5:
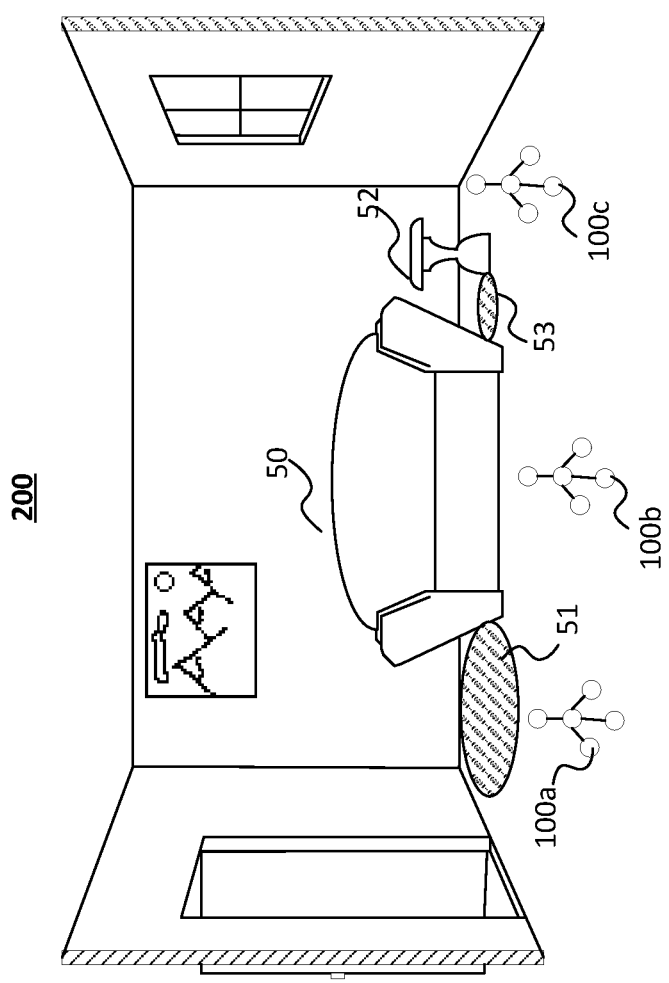
FIG. 5 shows an example scene that may be captured by the digital image capture device that includes at least one object and one or more sensors according to an implementation of the disclosed subject matter.
Figure 6:
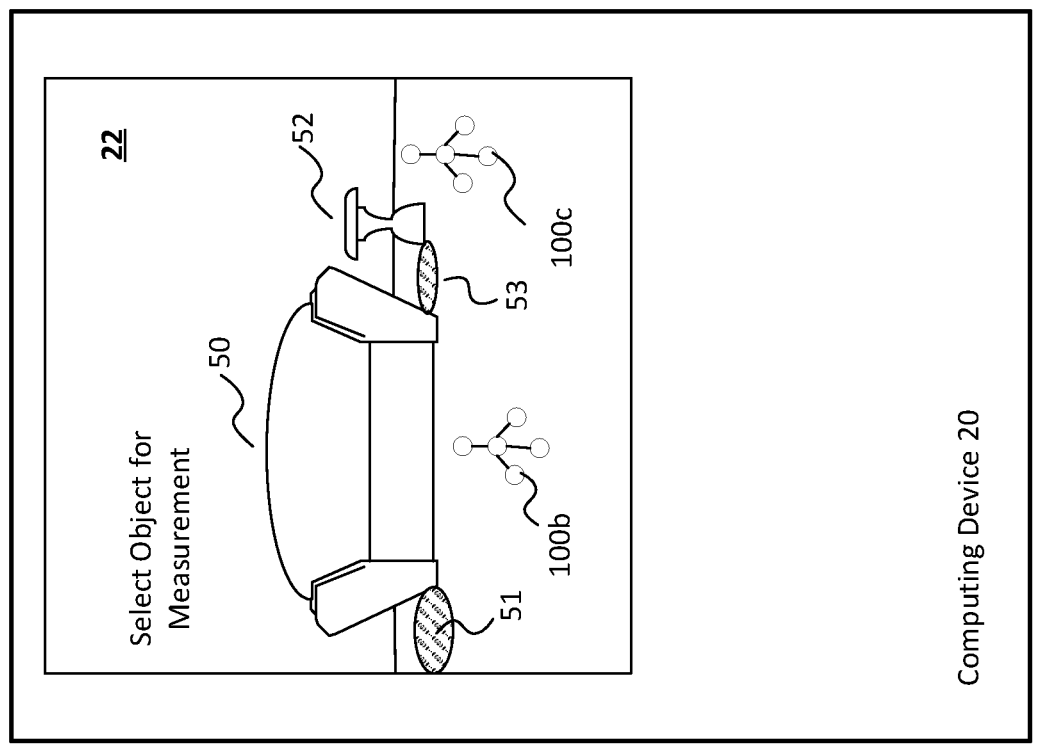
FIG. 6 shows a display of a captured scene on a computing device, where an object may be selected for measurement according to an implementation of the disclosed subject matter.

The digital image capture device 28 may capture an image of a scene which includes at least one of the plurality of sensors 100a, 100b, and/or 100c at operation 320. For example, FIG. 5 shows a scene 200 having sensors 100a, 100b and 100c. FIG. 6 shows a portion of the scene 200 captured and displayed on display 22 of the computing device 20, where sensors 100b and 100c are part of the captured scene. That is, the digital image capture device 28 may capture a portion of the scene 200 that does not include all of the dispersed sensors (based on the positioning of the computing device 20, a focus setting, a zoom setting, or the like of the digital image capture device 28. In some implementations, the captured scene may include all of the dispersed sensors (e.g., sensors 100a, 100b, and 100c).

In some implementations, the computing device 20 may receive a selection of an object to be measured in the captured scene. The captured image that may include the object 50, 52 is displayed on the display 22 of the computing device 20. A selection may be received by the computing device 20 (e.g., via user input device 26 shown in FIG. 8, and/or with a received touch by the display 22 if the display 22 is a touchscreen device). The object 50, 52 that may be selected and measured may be a selected portion of the image of the scene that is captured and/or a predetermined portion of the image of the scene that is captured.

At operation 330, a processor (e.g., processor 24 shown in FIG. 8) communicatively coupled to the digital image capture device 28 may determine a measurement of the object 50, 52 in the captured image of the scene 200, such as the selected object displayed on display 22. The measurement of the object 50, 52 may be based at least in part on the positional location information and/or the distance information received by the computing device 20 having the digital image capture device 28 (e.g., from one or more of the sensors 100a, 100b, and/or 100c) at the time that the image of the scene 200 is captured. In some implementations, the processor 24 of computing device 20, shown in FIG. 8 and described below, may be communicatively coupled via a bus 21 to the digital image capture device 28. The computing device 20 may determine its distance from each of the sensors 100a, 100b, and/or 100c located within the captured scene. In some implementations, when the computing device 20 receives the distance information from one or more of the sensors 100a, 100b, and/or 100c, the computing device 20 may determine its distance from one or more of the sensors 100a, 100b, and/or 100c located within the captured scene based on the received distance information and/or the received positional location information. The computing device may also determine its distance from any sensor located outside of the captured scene, but within range of communicating with the communications interface 29.

In some implementations, the processor 24 of the computing device 20 may use the information received from the sensors 100a, 100b, and/or 100c that is based on the reflected ultrasonic signals and/or the received reflected light signals to determine the measurements of the object 50, 52, and/or to increase the accuracy of the measurements of the object 50, 52 as described above. In some implementations, the information based on the reflected ultrasonic signals and/or the received reflected light signals may be used by the processor 24 in determining the measurement of the object 50, 52 that may be at least partly in a shadow of a captured image, and/or are in low light conditions.

Using the determined distances from the computing device 20 to the sensors 100a, 100b, and/or 100c, and/or using the distance information of the sensors 100a, 100b, and/or 100c, the processor 24 may determine and/or approximate the measurements of the object 50, 52. For example, if the object 50, 52 has a cube shape, the processor 24 may determine the length, width and height of the object 50, 52 based on the received positional location information and/or the distance information from sensors 100a, 100b, and/or 100c. If the object 50, 52 is a sphere, the processor 24 may determine at least the height and diameter measurements, and may determine the circumference. If the object 50, 52 is a polygonal object, or an object such as the couch (object 50) and/or the table (object 52) shown in FIG. 5, the processor 24 may determine at least the maximum values for a length, width, and/or height of the object 50, 52. In some implementations, additional sensors and/or distance information may be used to increase the precision of measurements of the object 50, 52 by the processor 24. That is, additional positional location information and/or distance information may increase the precision of determined and/or approximated measurements of the object 50, 52 by the processor 24.

The positional location information and/or distance information of the sensors 100a, 100b, and/or 100c may define three-dimensional (3-D) coordinates, which define the locations of points in 3-D space. The image coordinates (e.g., the positions of the sensors 100a, 100b, and/or 100c in the captured image) may define the locations of one or more points of object 50, 52 in images captured by the image capture device 28 of the computing device 20. The orientation of the image capture device 28 and/or the computing device 20 may determine its location in space and the view direction to capture the scene 200. The orientation of the image capture device 28, as well as the position of the sensors 100a, 100b, and/or 100c (which may include, e.g., the positions of the nodes 112, 114, and/or 116 of the sensors 100a, 100b, and/or 100c) may define the geometric parameters from which the object 50, 52 may be measured. The focal length of a lens used to image a scene onto the image capture device 28 may be used in defining the geometric parameters, but can also include the distortions and/or aberrations of the lens. Using the distance between known points in space (e.g., the distance between the computing device 20 and the sensor 100a, 100b, 100c, the distances between the sensors, and/or the distance information between the nodes 112, 114, and/or 116 and the sensor 104), a correlation to the measuring units (e.g., the units to measure one or more dimensions of object 50, 52) may be created.

The distance between each of the sensors 100a, 100b, 100c may be known, as the sensors 100a, 100b, 100c may determine whether they are within communicating proximity (i.e., capable to receive communications with one another over a predetermined distance range) of each other by transmitting identification requests (i.e., for other sensors to identify themselves) and by receiving identification messages (e.g., type of sensor, location of the sensor, and the like) from one or more sensors which receives the identification request. In some implementations, the sensors 100a, 100b, 100c may transmit their positional location information to one another after determining that they are located within communicating proximity of one another. In some implementations, the positional location information may include the distance information (e.g., distances between the sensor 104 and one or more of the nodes 112, 114, and/or 116). The sensors 100a, 100b, 100c may periodically transmit positional location information and/or distance information to one another, and/or one or more of the sensors 100a, 100b, 100c may transmit positional location information when its location changes. In some implementations, the sensors 100a, 100b, 100c may periodically determine their relative position to one another and/or the computing device 20 by transmitting signals and determining distance based on the time-of-flight of the signals. The distance information and/or positional location information, along with changes to the positional location information, may be transmitted from the sensors 100a, 100b, and/or 100c to the computing device 20. In some implementations, the distance between positional locations of the sensors 100a, 100b, 100c may be periodically measured and transmitted to the computing device 20.

The processor 24 of the computing device 20 may minimize a sum of the squares of errors over the coordinates and relative displacements of the reference points (e.g., the positional location information and/or the distance information of the sensors 100a, 100b, 100c). In some implementations, the processor 24 may minimize the sum of squares using, for example, the Levenberg-Marquardt algorithm or any suitable method of solving least squares problems.

At operation 340, a display device (e.g., display 22 which may be communicatively coupled to the processor 24 via bus 21), may display the determined measurements of the at least one object (e.g., object 50 and/or object 52). For example, the display 22 in FIG. 7 may show measurements (e.g., 38 inches×72 inches×28 inches) of an object of a scene that is selected by a user (e.g., object 50). Although English units of measurement are shown in FIG. 7, the computing device 20 may receive a selection to display units in metric or English units. The displayed measurements shown on display 22 may be the three dimensional measurements (e.g., the length, width, and height or dimensions in the x, y, z directions) of the object 50. In some implementations, measurements of portions of the object, such as different features of an object, may be displayed based on a selection received by the computing device 20 for such measurements and/or a location on an object for the measurements.

In some implementations, the captured image and the received positional location information and/or distance information of the sensors may be stored in a storage device, such as memory 27, fixed storage 23, and/or removable media 25. In some implementations, the user interface (e.g., user input 26 shown in FIG. 8) may receive another selection for an object of interest displayed on the display 22, and may determine and display the measurements for the new object of interest using the stored image, the positional location information, and/or the distance information.

In some implementations, the dimensions of sensors 100a, 100b, and/or 100c may be stored in a storage device of the computing device 20, such as memory 27, fixed storage 23, and/or removable media 25 that is communicatively coupled to the processor 24 via bus 21. The dimensions of the sensors 100a, 100b, and/or 100c may be used by the processor 24 to determine the measurements of the object 50, 52 and/or any other object selected in the displayed scene. In some implementations, the distances between the center of the sensor 104 to the center of the node 112, 114, and/or 116, the distances between the center of the sensor 104 to an outer edge of the node 112, 114, and/or 116, and/or the distances from the outer edge of the sensor 104 to an outer edge of the node 112, 114, and/or 116 may be used by the processor 24 to determine the measurements of the object 50, 52 and/or any other object selected in the displayed scene. That is, the computing device 20 may receive and/or store precise measurements and/or dimensions of sensors 100a, 100b, 100c, where the distance, dimensions, and/or measurements may include any housing and/or protective cladding that the sensors 100a, 100b, 100c may have.

As the computing device 20 has the stored measurements and/or dimensions of the sensors 100a, 100b, 100c, it may determine the dimensions of object 50, 52 captured in a scene based on the dimensions and/or measurements of the sensors 100a, 100b, and/or 100c, and/or the determined distances between the sensors 100a, 100b, 100c and/or the computing device 20. The processor 24 may determine the dimensions of another object selected in a displayed image (e.g., that has been captured by the image captured device 28) based on the stored measurements and/or dimensions of the sensors 100a, 100b, 100c. The processor 24 may determine the dimensions of object 50, 52 captured in a scene by the based on the dimensions and/or measurements of the sensors 100a, 100b, and/or 100c, the received and/or stored distance information, and/or the determined distances between the sensors 100a, 100b, 100c and/or the computing device 20.

In some implementations, the processor 24 may determine which of the plurality of sensors 100a, 100b, and/or 100c are located within the captured image of the scene. This may be based on, for example, at least one of a lens characteristics of a lens coupled to the digital image capture device 28, a focus setting of the lens, a zoom setting of the lens or of the digital image capture device 28, and/or the positional location information received by the digital image capture device 28. The lens characteristic may include focal length, focal range, maximum aperture (i.e., F-stop), whether the lens has a fixed focal length (e.g., 50 mm, 85 mm, 100 mm, or the like), whether the lens is a wide angle lens which has a shorter focal length (e.g., 10-42 mm), whether the lens is a telephoto lens with a narrow field of view (e.g., with a focal length of 100 mm-800 mm), whether the lens is a zoom lens with a variable focal length (e.g., 24-300 mm), a fisheye lens (e.g., having a focal length of 7-16 mm), a macro lens for close-up imaging (e.g., with a focal length of 50-200 mm), and/or a tilt-shift lens which allows for the manipulation of vanishing points, or the like. The focus setting of the lens may be a particular focal setting for the lens set via autofocus by the digital imaging capture device 28, or by a focus set by a user. A zoom setting of the lens may be the focal length value in the range of settable focal lengths of the zoom lens. Positional location information and/or distance information received by the communications interface 29 of the computing device 20, and may include positional location information and/or distance information of one or more of the sensors 100a, 100b, and/or 100c. The positional location information may include the location of the sensor 100a within a space and/or area.

The processor 24 may determine a position of the at least one object (e.g., object 50, object 52, or the like) in the scene based on the positional location information and/or the distance information received by the digital image capture device 28 at the time that the image of the scene is captured. That is, at the time of the image capture, the processor 24 may receive, via the communications interface 29, positional location information and/or distance information from one or more of the sensors 100a, 100b, and/or 100c. The positional location information may be the most recently received positional location information, and/or may be the positional location information received on or about the time of image capture. In some implementations, the processor 24 and/or the digital image capture device 28 may request that one or more of the sensors 100a, 100b, and/or 100c transmit their positional location information at the time that the image of the scene is captured.

In some implementations, the processor 24 may determine whether a shadow portion (e.g., shadow portion 51 of the object 50, shadow portion 53 of the object 52, or the like) of the at least one object (e.g., object 50, object 52, or the like) is in the image of the scene that is captured. The processor 24 may subtract the shadowed portion of the object in order to determine the measurement of the object. For example, object 50 may have shadow portion 51. When the object 51 is selected for measurement by the user of the computing device 22, the processor 24 may determine the measurements of the selected object 51 (e.g., as shown in FIG. 6), where the processor 24 has subtracted the shadow portion 51 from the measurements of the object 51.

Figure 7A:
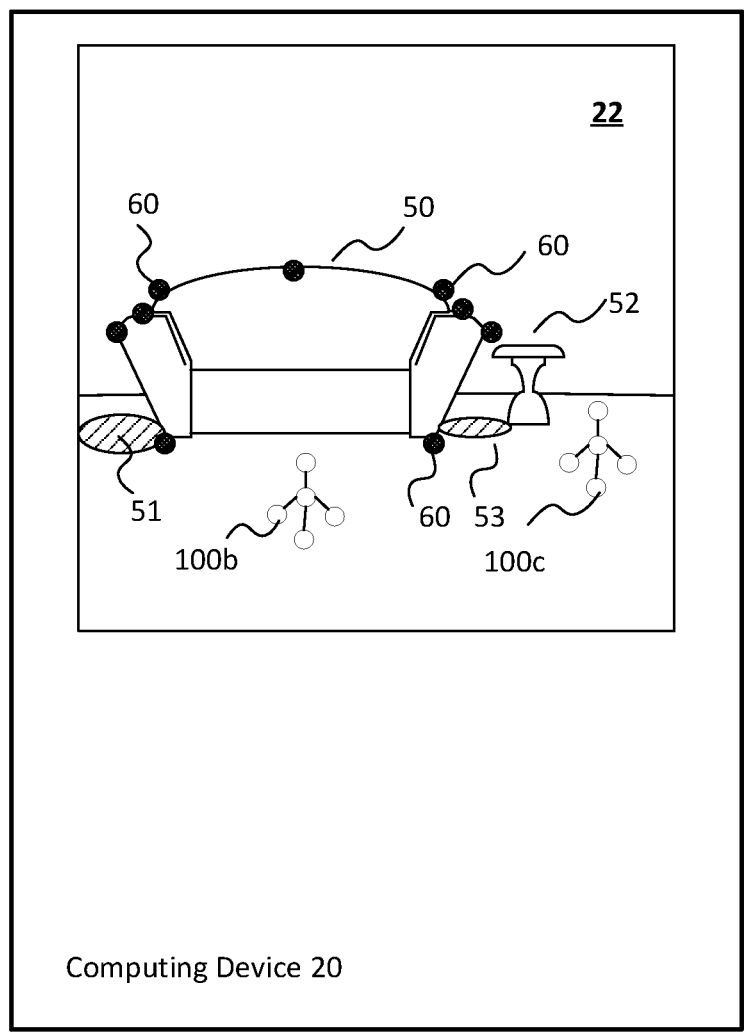
FIG. 7A shows a display of a captured scene on a computing device, including measurements of a selected object according to an implementation of the disclosed subject matter.

The processor 24 may determine the measurement of at least one object (e.g., object 50, object 52, or the like) by identifying a plurality of perimeter points (e.g., perimeter points 60) of the at least one object (e.g., object 50) to measure. For example, when object 50 is selected to be measured as shown in FIG. 6, perimeter points 60 for the object are displayed, as shown in FIG. 7A. The dimension of object 50 may be presented in display 22, as shown in FIG. 7B.

Figure 7B:
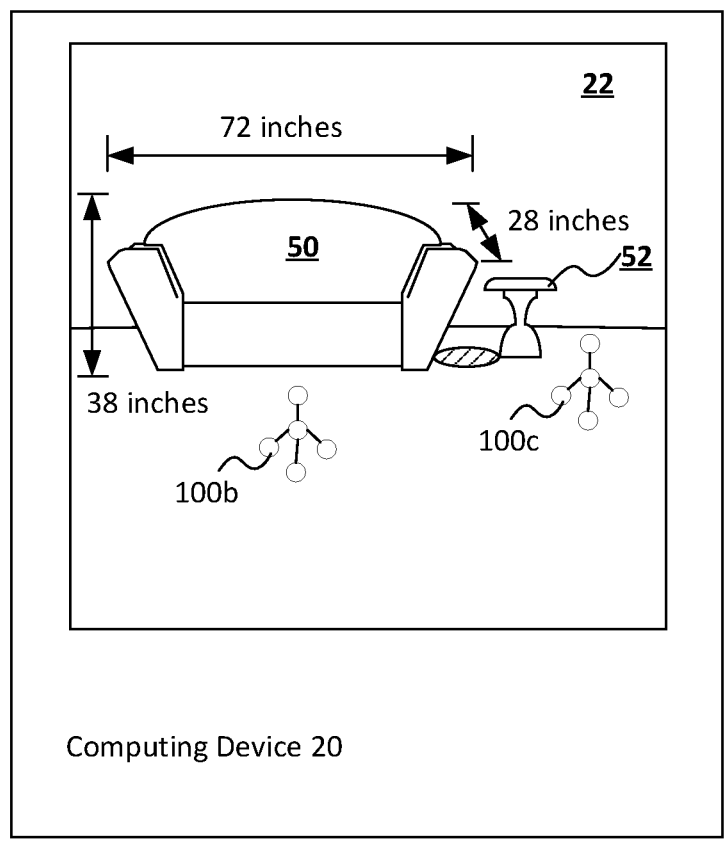
FIG. 7B shows a display of a captured scene on a computing device, including measurements of a selected object according to an implementation of the disclosed subject matter.

As part of the selection of an object shown in FIGS. 6-7B, the processor 24 may determine the bounds of particular objects (e.g., object 50, 52) in a captured image. Objects may appear different in a captured image based on the conditions in a scene when the image is captured. For example, there may be differences in lighting, shadows, and/or the orientation of the image capture device 28. The processor 24 may perform edge detection in the captured image to determine the edges of one or more objects (e.g., object 50, 52) present in the image.

For example, the processor 24 may apply a filter to smooth the image by removing noise elements. The smoothing of the image by removing the noise elements may reduce false edge detection. The processor 24 may determine intensity gradients for the smoothed image. In some implementations, the processor 24 may use a plurality of filters to detect horizontal, vertical, and diagonal edges.

For example, the processor 24 may use non-maximum suppression as an edge thinning technique. That is, for each pixel in the gradient image, the processor may compare the edge strength of the current pixel with the edge strength of the pixel in the positive and negative gradient directions. If the edge strength of the current pixel is the largest compared to the other pixels in a mask with the same direction (e.g., when the pixel is pointing in the y-direction, it will be compared to the pixel above and below it in the vertical axis), the value may be preserved by the processor 24. Otherwise, the process or may suppress the value.

In some implementations, the processor 24 may categorize the continuous gradient directions into a set of discrete directions, and may move a filter (e.g., a 3×3 filter or other suitable dimension filter) over the output of the previous operation (that is, the edge strength and gradient directions). The processor 24 may suppress the edge strength of the center pixel (e.g., set its value to zero) if its magnitude is not greater than the magnitude of the two neighbors in the gradient direction.

Upon performing non-maximum suppression by processor 24, the remaining edge pixels in the image may provide a more accurate representation of real edges in an image. Some edge pixels that remain may be caused by noise and/or color variation. In order to address these edge pixels, the processor 24 may filter out edge pixels with a weak gradient value and preserve edge pixels with a high gradient value. The processor 24 may select suitable high and low threshold values to accomplish this.

If the processor 24 determines that an edge pixel's gradient value is higher than the selected high threshold value, the processor 24 may mark it as a strong edge pixel. If an edge pixel's gradient value is determined by the processor 24 to be smaller than the high threshold value and larger than the low threshold value, the processor 24 may mark it as a weak edge pixel. If an edge pixel's value is smaller than the low threshold value, the processor 24 may suppress it. In some implementations, the two threshold values may be empirically determined by the processor 24. The threshold values may depend on the content of a given input image (i.e., an image captured by digital image capture device 28).

The processor 24 may track edges by hysteresis. That is, the processor 24 may finalize the detection of edges by suppressing all the other edges that are weak and not connected to strong edges. Weak edges and strong edges may be determine in a similar manner as weak and strong edge pixels. The processor 24 may select strong edge pixels for the final edge image, as these edges are extracted from the true edges in the image. For the weak edge pixels, the processor may extract these pixels from the true edge, or the noise and/or color variations. To increase the accuracy of a resulting image, the weak edges caused by the noise and/or color variations may be removed by the processor 24. Typically, a weak edge pixel caused from true edges may be connected to a strong edge pixel, while noise responses are unconnected. To track the edge connection, the processor 24 may consider a weak edge pixel and its 8-connected neighborhood pixels. As long as there is one strong edge pixel in this grouping, that weak edge point may be identified by the processor 24 as one that should be preserved.

When the edges have been identified in the resultant image, the computing device 20 may display the image. The computing device 20 may receive a selection of an object 50, 52 or any other suitable object in the displayed image, and measurements may be displayed, based on the determined edges of the selected object, the position of the sensors, and/or the dimensions of the sensors.

In some implementations, the processor 24 may determine the measurement of the object 50, 52 based on trilateration by using a plurality of perimeter points (e.g., perimeter points 60) of the object 50, 52 and the positional location information and/or distance information of sensors 100a, 100b, and/or 100c. For example, if the positions of the sensors 100a, 100b, and 100c are known based on transmitted positional location information and/or distance information, the processor 24 may determine the location of the object 50, 52.

The sensors 100a, 100b, and/or 100c may measure the object 50, 52 and/or locate the position of the computing device 20 using trilateration, echolocation, transmission and reflection of light (e.g., IR light or laser light), or the like. For example, the sensors 100a, 100b, and/or 100c may output an ultrasonic signal. The reflected ultrasonic signals may be received by the sensors, 100a, 100b, and/or 100c, and the sensors may transmit information to the computing device 20 based on the reflected ultrasonic signals. The processor 24 of the computing device 20 may determine the measurements of and/or increase the accuracy of the measurements of the object 50, 52 based on the received information so as to determine the measurements of the object 50, 52 by echolocation. Similarly, the sensors 100a, 100b, and/or 100c may output an ultrasonic signal, and may determine the position of the computing device 20 based on echolocation by using the reflected ultrasonic signals.

In another example, the sensors 100a, 100b, and/or 100c may output a light signal (e.g., IR light from a light emitting diode, laser light from a semiconductor laser, or the like). The reflected light signals may be received by the sensors, 100*a*, 100*b*, and/or 100*c*, and the sensors may transmit information to the computing device 20 based on the reflected light signals. The processor 24 of the computing device 20 may determine the measurements and/or increase the accuracy of the measurements of the object 50, 52 based on the received information so as to determine the measurements of the object 50, 52. Similarly, the sensors 100*a*, 100*b*, and/or 100*c* may output a light signal, and may determine the position of the computing device 20 based on the reflected light signals.

Figure 8:
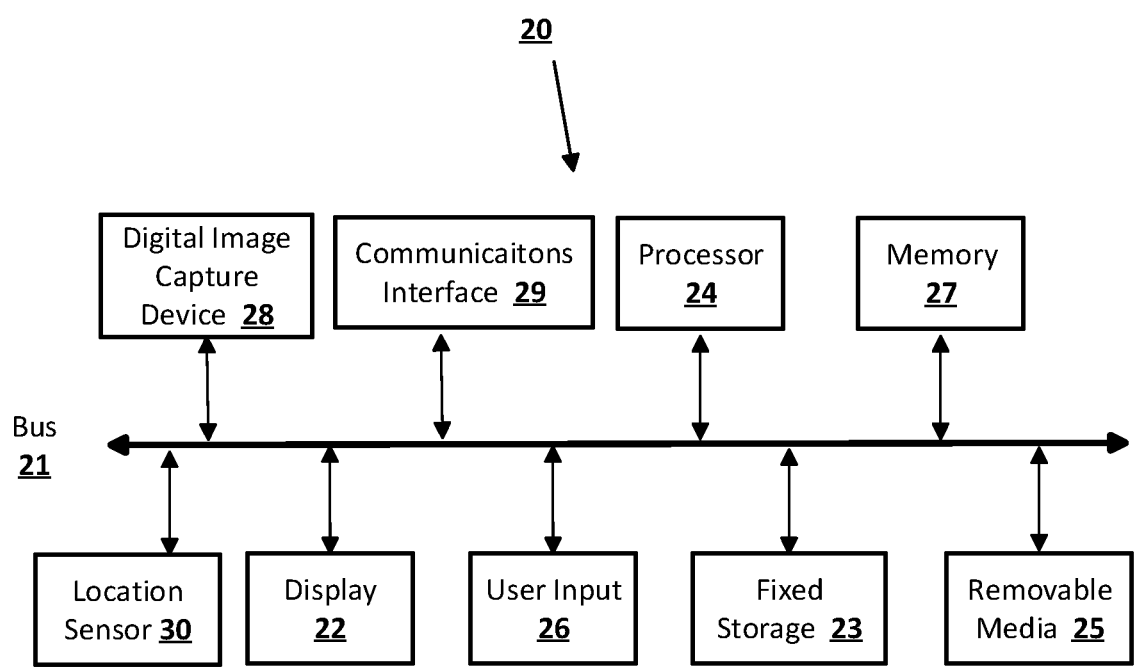
FIG. 8 shows a computing device having a digital image capture device according to an implementation of the disclosed subject matter.

Implementations of the presently disclosed subject matter may be implemented in and used with a variety of component and network architectures. FIG. 8 is an example computing device 20 suitable for implementing the presently disclosed subject matter. The device 20 may be, for example, a mobile computing device such as a smart phone, tablet, a laptop, or any suitable computer. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, a digital image capture device 28, and the communications interface 29 operable to communicate with one or more sensors 100*a*, 100*b*, and/or 100*c*, and/or one or more remote devices via a suitable network connection. The computing device 20 may include a location sensor 30, which may be a device that determines the location of the computing device 20. The location sensor 30 may be a GPS (global positioning system) device or the like.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computing device 20 are generally stored on and accessed via a computer readable medium, such as a solid state drive, a hard disk drive (e.g., fixed storage 23), an optical drive, floppy disk, or other storage medium.

The fixed storage 23 may be integral with the computing device 20 or may be separate and accessed through other interfaces. The communications interface 29 may provide a direct connection to one or more of the sensors 100*a*, 100*b*, and/or 100*c*, and/or a remote server via a wired or wireless connection (e.g., communications link 60). The communications interface 29 may provide such connection using any suitable technique and protocol as will be readily understood by one of skill in the art, including digital cellular telephone, WiFi, Bluetooth®, near-field, and the like. For example, the communications interface 29 may allow the computer to communicate with other computers via one or more local, wide-area, or other communication networks.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A system comprising:
a plurality of sensors that are communicatively coupled to one another, wherein at least one sensor of the plurality of sensors includes:
a light emitting device to radiate an object with light signals; and
a sensor device to receive reflected light from the object; and
a sensor processor to determine a distance between the sensor and the object, based on the received reflected light from the object; and
a communications interface to transmit the determined distance;

a digital image capture device, communicatively coupled to the plurality of sensors, to capture an image of a scene which includes the at least one of the plurality of sensors and the object;

a processor, communicatively coupled to the digital capture device, to determine which of the plurality of sensors are located within the captured image of the scene based on the determined distance received by the digital image capture device from the at least one sensor, to receive a selection of at least one object in the captured image of the scene and to determine a measurement of the selected at least one object in the captured image of the scene, wherein the measurement of the selected at least one object is based at least in part on the determined distance received by the digital image capture device at the time that the image of the scene is captured and based on dimensions, received by the processor, of the at least one of the plurality of sensors; and a display device, communicatively coupled to the processor, to display the determined measurements of the selected at least one object.

2. The system of claim 1, wherein the light emitting device is selected from the group consisting of: a light emitting diode and a laser.

3. The system of claim 1, wherein the selected object that is radiated by the light emitting device is the digital image capture device, and the determined distance is a distance between the sensor device and the digital image capture device.

* * * * *